United States Patent Office 3,574,824
Patented Apr. 13, 1971

3,574,824
ANHYDROUS TOOTHPASTE FORMULATION
James Echeandia, Richmond, Va., Yashvant Kapadia, Lafayette, Ind., Howard Rubin, Belleville, N.J., and Jacques Tossounian, Bryn Mawr, Pa., assignors to Warner-Lambert Pharmaceutical Company, Morris Plains, N.J.
No Drawing. Filed May 3, 1968, Ser. No. 726,547
Int. Cl. A61k 7/16
U.S. Cl. 424—50
2 Claims

ABSTRACT OF THE DISCLOSURE

An anhydrous toothpaste base is prepared using the following ingredients: (1) an oil having a viscosity of 100 to 300 centipoises, such as mineral oil, light liquid petrolatum thickened to the necessary viscosity, or an antioxidant stabilized vegetable oil; (2) a combination of polyethylene glycols having a viscosity of 2200 to 3400 centipoises with molecular weights ranging from 550 to 6000; (3) a non-toxic, non-ionic emulsifier which is a mixture of glycerides of $C_{12}$ to $C_{17}$ fat-forming fatty acids; (4) at least one binding agent selected from polyvinylpyrrolidone having an average molecular weight of 40,000 and a colloidal magnesium aluminum silicate; and (5) a compound having a negative heat of hydration which can be a hexahydric alcohol such as mannitol or inositol. To this base, 30% to 70% of an abrasive may be added. The abrasive may be aluminum hydrate and/or calcium sulfate and can contain a small amount of aluminum silicate. Dentrifrice additives such as enzymes, bleaching agents which achieve whitening and brightening effects, fluorides, and the like, which are incompatible with standard hydrous toothpaste formulations will remain stable and active when added to this anhydrous toothpaste base. Taste, consistency and foaming properties of the paste are equivalent to hydrous toothpaste formulations.

BACKGROUND OF THE INVENTION

Standard prior art toothpastes generally contain flavors, synthetic detergents, abrasives, formulating liquids (such as glycerin, propylene glycol, sorbitol solution, water and alcohol), and thickeners which may include starch, tragacanth, alginate, carrageenan and cellulose derivatives. Non-carbohydrate sweetening agents may also be present. Typical abrasives used in these toothpaste formulations are: calcium carbonate, the calcium phosphates, calcium sulfate, insoluble sodium metaphosphate, hydrated aluminum oxide, magnesium carbonates and phosphates, sodium bicarbonate, and sodium chloride.

A representative hydrous toothpaste base [1] contains the following ingredients:

| | Gm. |
|---|---|
| CMC 120 H | 0.9 |
| Glycerin | 1.0 |
| Propylene glycol | 18.0 |
| Purified water | 13.5 |
| Methyl paraben | 0.1 |
| Saccharin sodium solution 50% | 0.1 |
| Peppermint oil | 0.3 |
| Mineral oil | 1.0 |
| Sodium lauryl sulfate | 2.5 |
| Dicalcium phosphate, in very fine powder | 54.0 |

To this formulation various medications and dental adjuvants are added to provide specific beneficial qualities. The incorporation of a certain amount of liquid in the toothpaste formulation is necessary to insure the proper consistency and foaming properties in the final product.

[1] Remington's Pharmaceutical Science, 13th edition, Mack Publishing Co., Easton, Pa. 1965, p. 1486.

The incorporation of certain water incompatible dentifrice additives, such as enzymes or bleaching agents which achieve whitening and brightening effects, in ordinary hydrous toothpastes has not been possible because of the instability or inactivity of these substances in the presence of moisture. Enzymes, for example, are known to lose their activity in the presence of water, and some fluoride additives form insoluble salts with the other ingredients in the hydrous toothpastes, thus rendering them ineffective for protection against caries. With other therapeutic additives, difficulties involving production and storage are encountered. As a result, the marketing of toothpaste products containing certain additives has not been feasible. Moreover, attempts to formulate anhydrous toothpastes to circumvent the water incompatibility problem have been unsuccessful from the standpoint of consumer acceptance of these products. For example, an experimental paste has been made by using oily liquids, such as vegetable oil or extra light mineral oil and a suitable surfactant. However, when this paste is brought into contact with water during the brushing of the teeth, insufficient foaming properties are evident. This is thought to be due to the fact that the foaming agent (such as sodium lauryl sulfate) is "hindered" in the anhydrous mass and is unable to concentrate at the air-water interface during brushing to form air bubbles or foam. Another disadvantage of this paste is that the oil, used instead of the glycerin and the water in a standard hydrous toothpaste, has a tendency to separate out on storage.

In order to overcome these difficulties, attempts have been made to incorporate a higher concentration of a soap made by partial saponification of fatty acids, such as isostearic, oleic, and lauric acids. However, products containing these soaps were also unsuccessful, due to the fact that the soaps were sensitive to hard water, and lost much of their surface activity on standing. Even with higher concentrations, it was not possible to obtain an adequate amount of foam while brushing.

Other disadvantages of some earlier anhydrous toothpaste formulations included unacceptable taste, and/or consistency, heat sensation during brushing, irritation of the mucous membranes of the mouth and hardening of the paste on storage.

SUMMARY OF THE INVENTION

This invention relates to a substantially anhydrous toothpaste formulation which may be used as a vehicle for water incompatible enzymes, bleaching agents, fluorides and other therapeutic dentifrice additives suitable for use in the oral cavity. Commercially acceptable products are obtained.

DESCRIPTION OF THE INVENTION

This invention provides a substantially anhydrous toothpaste base, suitable for use in the oral cavity, which when formulated, has a consistency, foamability and taste equivalent to the commercially available hydrous dentifrices. Further, it provides a substantially anhydrous toothpaste which may contain 30% to 70% of an abrasive. Additionally, water incompatible dentifrice additives such as enzymes, bleaching agents, fluorides and the like, when added to this substantially anhydrous toothpaste base or formulation, remain stable throughout the normal shelf-life of the toothpaste product.

The substantially anhydrous base of this invention is formulated from the following ingredients: (1) an oil having a viscosity of from about 100 to about 300 centipoises at 70° F.; (2) a combination of polyethylene glycols having a viscosity of from about 2200 to about 3400 centiposises at 70° F.; (3) a non-toxic, non-ionic emulsifier; (4) at least one binding agent; (5) a compound having a negative heat of hydration; (6) an abrasive or abrasive-free inert ingredients; (7) standard toothpaste additives; and optionally, (8) water incompatible dentifrice additives.

The above-mentioned ingredients must, of course, be non-toxic and substantially anhydrous. They may be used in the following proportions:

| Ingredient | Broad range percent by weight[1] | Preferred range percent by weight[1] |
| --- | --- | --- |
| Oil | 5-35 | 10-30 |
| Polyethylene glycol combination | 15-50 | 20-30 |
| Emulsifier | 0.1-0.5 | 0.2-0.3 |
| Binding agent | 0.2-2 | 0.4-1 |
| Compound having a negative heat of hydration | 1-10 | 3.0-5 |
| Abrasive or abrasive-free inert ingredient | 30-70 | 40-60 |

[1] Based on the total weight of the finished toothpaste.

Small quantities of standard toothpaste ingredients and water incompatible dentifrice additives can also be added, as desired. For example, from about 0.5% to about 3%, preferably from about 1.5% to about 2% by weight of flavoring can be added.

Suitable oils for use in the practice of this invention include those which have viscosity ranging from about 100 to about 300 centipoises at 70° F., and can be mineral oil, light liquid petrolatum thickened to the neessary viscosity; and vegetable oils. The preferred mineral oil is Mineral Oil U.S.P. (also known as Liquid Petrolatum U.S.P., mineral oil (heavy medicinal), white mineral oil, liquid paraffin, and heavy liquid petrolatum). Mineral Oil U.S.P. is defined in Remington's Pharmaceutical Sciences, 13th edition, Mack Publishing Co., Easton, Pa. 1965, as "a mixture of liquid hydrocarbons obtained from petroleum; a colorless, transparent, oily liquid, free or nearly free from fluorescene. It is tasteless and odorless when cold and develop not more than a faint odor of petroleum when heated. Its specific gravity is between 0.860 and 0.905, and its kinematic viscosity is not less than 38.1 centistokes at 100° F." (i.e. not less than 32.8 centipoises at 100° F.). A particularly preferred oil is Mineal Oil U.S.P. having a viscosity of about 250 centipoises at 70° F., sold under the trade name PENTOL, by the Sonneborn Division of Witco Chemical Co., New York, N.Y.

The preferred light liquid petrolatum is Light Liquid Petrolatum N.F. also known as light liquid paraffin and light white mineral oil. It is described in Remington's Pharmaceutical Science, as " . . . a mixture of liquid hydrocarbons obtained from petroleum. It may contain a stabilizer." The specific gravity is given as between 0.828 and 0.880; and the kinematic viscosity is given as not more than 37 centistokes at 100° F. (or not more than 32.6 centipoises at 100° F.) If the Light Liquid Petrolatum N.F. is used as the oil it must be thickened to the required viscosity of from about 100 to about 300 centipoises at 70° F. with one of the well-known commercially available inert thickening materials, such as a pyrogenic silica solid under the tradename CAB-O-SIL by Cabot Corp., Boston, Mass.; or a hydrogenated castor oil, soil under the tradename THIXIN by the Baker Castor Oil Co., New York, N.Y.

Suitable vegetable oils which may be used as the oil ingredient in our invention include coconut oil, cottonseed oil, sesame oil and similar non-toxic vegetable oils, as described in Vegetable Fats and Oils, by E. W. Eckey, Reinhold Publishing Corp., New York, 1954. The vegetable oil selected must, of course, fall within the required viscosity range of from about 100 to about 300 centipoises necessary for our invention. A particular vegetable oil falling within this range is NEOBEE M-5, a fractioned triglyceride of coconut oil, marketed by Drew Chemical Corp. It is desirable that the vegetable oil ingredient contain a minor amount of an antioxidant such as butylated hydroxyanisole or butylated hydroxytoluene, preferably in an amount ranging from about 0.1% to about 3% by weight, based on the weight of the vegetable oil employed.

The combination of polyethylene glycols to be used in the anhydrous toothpaste formulation of this invention must have a viscosity of from about 2200 to about 3400 centipoises at 70° F.

A molecular weight range of from about 5500 to about 6000 is recommended. Polyethylene glycols below molecular weight 550 have a tendency to produce a bitter taste which cannot be readily masked; and higher molecular weight polyethylene glycols impart a gritty characteristic to the paste which is not desirable. It has been found however, that if a very small amount of a polyethylene glycol of molecular weight ranging from about 3000 to about 3700 is included in the combination, a highly desirable bodying effect is achieved in the final product. In a preferred embodiment of this invention, the polyethylene glycol combination comprises about 10% by weight of a polyethylene glycol of average molecular weight 550, about 10% by weight of a polyethylene glycol of average molecular weight 600, and about 0.5% by weight of a polyethylene glycol of average molecular weight 3350. The following products, sold commercially by Union Carbide Corp., N.Y., are especially recommended for use in the above preferred polyethylene glycol combination:

Polyethylene glycol 1500—(average molecular weight 550)

Polyethylene glycol 600—(average molecular weight 600)

Polyethylene glycol 4000—(average molecular weight 3350)

The emulsifiers which have been found useful in the anhydrous formulation of this invention are non-toxic, non-ionic emulsifiers which are mixtures of glycerides of $C_{12}$ to $C_{17}$ fat-forming fatty acids.

Mono- and diglycerides of this type are most effective. However, some triglyceride products may be used. It is also important that the odor and taste of the emulsifier be pleasing or such that it can be easily masked by the toothpaste flavoring ingredients. A particularly preferred emulsifier is sold commercially under the tradename ATMOS 300 by Atlas Chemical Industries, Inc. ATMOS 300 is chemically composed of mono- and diglycerides of fat-forming fatty acids. It is a colorless liquid with a viscosity of 150 centipoises at 25° C. and a specific gravity of 0.96 at 25° C.

The binding agents suitable for use in this invention are those which are operable in non-aqueous systems. Of these, those classified as natural and synthetic polymers have been particularly useful, among which may be mentioned, gum acacia, sodium alginate, extract of Irish moss, carboxymethylcellulose, methylcellulose, and polyvinylpyrrolidone. Colloidal magnesium aluminum silicate may also be used as a binding agent. Polyvinylpyrrolidone has been found to be particularly useful in combination with the colloidal aluminum magnesium silicate. It is preferred that approximately equal quantities of the polyvinylpyrrolidone and colloidal magnesium aluminum silicate be used. Especially good results have been found with a polyvinylpyrrolidone of molecular weight of approximately 40,000. In particular, a white, free-flowing powder which is odorless and tasteless, known as PLASDONE K–29–32 (sold commercially by General Aniline and Film Corp.) is the recommended polyvinylpyrrolidone. The colloidal magnesium aluminum silicate binding agent which is preferred for use in the formulation of this invention is produced primarily from a blend of silicates showing high magnesium content (saponites). A product sold commercially by the R. T. Vanderbilt Co., Inc., known as VEEGUM is particularly preferred. The average chemical analysis of VEEGUM conventionally expressed as oxides is as follows: silicon dioxide, 61.1%; magnesium oxide, 13.7%; aluminum oxide, 9.3%; titanium dioxide, 0.1%; ferric oxide, 0.9%; calcium oxide, 2.7%; sodium oxide, 2.9%; potassium oxide, 0.3%; carbon dioxide, 1.8%; water of combination, 7.2%. Of the various grades of VEEGUM available, VEEGUM F, which is a micro-fine powder, is particularly preferred.

Prior anhydrous toothpaste formulations had a serious disadvantage in that heat seemed to be generated during brushing of the teeth. This, of course, is an undesirable departure from the mouth-feel of the usual hydrous formulations and seriously restricts the marketability of anhydrous products. It has now been found, quite surprisingly, that the inclusion of a compound with a negative heat of hydration, overcomes this problem completely. The compound having a negative heat of hydration must, of course, be non-toxic, compatible with the other ingredients in the anhydrous formulation, and of agreeable taste and odor. It has been found that a hexahydric alcohol, such as mannitol or inositol, is useful for this purpose with mannitol being particularly preferred.

Abrasives which may be used in the anhydrous toothpaste of this invention are aluminum hydrate and calcium sulfate, alone or in combination. The aluminum hydrate, also known as aluminum trihydrate, aluminum hydroxide and hydrated alumina, has the formula $Al(OH)_3$; and the calcium sulfate abrasive has the formula $CaSO_4.2H_2O$. Suitably, the abrasive aluminum silicate ($Al_2O_3.3SiO_2$) may also be present in place of part of the above abrasives up to an amount of from about 1% to about 10%, preferably from about 1% to about 5% by weight, based on the weight of the finished toothpaste formulation with remainder of the required total amount of abrasive being aluminum hydrate and/or calcium sulfate. It is not desirable to use the aluminum silicate alone. In a particularly preferred formulation, about 3% of aluminum silicate is included.

If desirable, a non-abrasive toothpaste may be formulated by using about 30% to about 70%, preferably about 40% to about 60% of a non-abrasive inert ingredient such as lactose. A formulation of this type is particularly useful when certain therapeutic additives are to be included.

Typical toothpaste flavoring agents, among which may be mentioned, spearmint, peppermint, wintergreen, sassafras, cinnamon, anise, clove, carraway, eucalyptus, thyme, menthol, citrus oils, nutmeg, eugenol, vanillin, and the like, are suitable for inclusion in our anhydrous base. A particularly preferred flavoring combination is exemplified by the following formulation:

| | Gm. |
|---|---|
| Peppermint oil | 12.0 |
| Spearmint oil | 4.0 |
| Anise oil U.S.P. | 1.0 |
| Menthol U.S.P. | 1.0 |
| Clove oil U.S.P. | 1.0 |
| Eucalyptus oil U.S.P. | 1.0 |

The other components in our anhydrous toothpaste which may optionally be included are the standard toothpaste ingredients such as synthetic detergents, non-aqueous formulating liquids, bodying agents, coloring agents, and non-carbohydrate sweeteners. With the exception of flavors and sweeteners, which are added at a slightly higher level, these ingredients are added in the small amounts usual for hydrous toothpaste formulations.

While many commonly known toothpaste components representative of the above-mentioned ingredients can be used in our formulation, certain materials, when used in our combination, provide improved product quality. Among the non-aqueous formulating ingredients Propylene Glycol, U.S.P. and Petrolatum N.F. have been found to be most suitable. The synthetic detergent additive which is preferred is sodium lauryl sulfate, in powder form, although other toothpaste detergents may be used.

Other ingredients, such as bodying agents are added to give the proper consistency to our paste. Among these may be mentioned sodium alginate, such as a product sold commercially as KELCOGEL LV, by Kelco Co., N.J.; and carrageenan sold commercially as VISCARIN-TR4 by Marine Colloids Co., Inc., Springfield, N.J. Aluminum silicate sold commercially as KAOPOLITE SF by H. Johnson Co., N.J., may also serve as an abrasive and its inclusion in the formulation is particularly preferred.

The saccharin and cyclamate sweetening agents which may be used to provide added flavor to the anhydrous toothpaste base include sodium cyclamate, calcium cyclamate, saccharin, saccharin sodium, calcium saccharin and combinations thereof. A particularly preferred combination is prepared from saccharin sodium, saccharin, and calcium cyclamate used at levels of from about 0.1 to about 1% by weight based on the weight of the finished toothpaste product.

The finished toothpaste base of our invention is substantially anhydrous, containing only traces of moisture, depending on the ingredients used in the formulation.

Dentifrice ingredients which are added to our anhydrous toothpaste base remain stable and active throughout the normal shelf-life of the toothpaste. Enzyme additives which retard plaque formation or remove plaque already on the teeth can be advantageously added to our anhydrous toothpaste base. Since dental plaque is formed from ingested proteins, carbohydrates, and fats or combinations thereof, proteases, polysaccharidases and lipases, which break down the plaque-forming substances may be used alone or in combination to prevent plaque formation or remove it from the tooth surface. One such enzyme, which is primarily a proteolytic enzyme of fungal origin, is described in the Harrison and Packman patent, U.S. 3,194,738 assigned to American Chicle Co. The enzyme is produced by inoculating a moist nutrient medium with a heavily sporulated culture of *Aspergillus oryzae*, and maintaining said inoculated medium at a suitable temperature for a suitable period of time and separating therefrom enzyme products having a proteolytic activity of not less than 2000 casein units per gram, not less than 10,000 hemoglobin units per gram, and not less than 25,000 gelatin viscosity units per gram and having an amylolytic activity of not less than 100 SKB units per gram and not less than 500 starch liquefaction units per gram and characterized by having a ratio of casein unit activity to hemoglobin unit activity of not less than 1:3 and a ratio of SKB unit activity to starch liquefaction unit activity of not less than 1:2. Generally the enzyme product should be present in the amount of from about 0.1% to about 6%, preferably from about 0.4% to about 4% by weight based upon a single strength activity of the enzyme composition.

A polysaccharidase suitable for inclusion in our anhydrous toothpaste base is dextranase. This enzyme may be derived from any micro-organism which produces dextranase in substantial quantities, such as *Penicillium funiculosum* or *Penicillium lilacinum*. Generally, the dextranase should be present in the toothpaste product in an amount of from about 0.1% to about 6%, preferably from about 0.4% to about 4% by weight, base on the single strength activity of the enzyme composition, wherein the single strength activity can be expressed as 100,000 BGU ($\beta$-Glucosidase Units); or as 50,000 SKB (Starch Dextrinizing Units, using the method of Sandstadt, Kneen, and Blish); or as 35,000 BAU (Bacterial $\alpha$-Amylase Units).

A lipase suitable for inclusion in our anhydrous toothpaste base is glycerol ester hydrolase, derived from hog pancreas, wheat germ or similar source materials containing lipase. Generally, this enzyme should be present in the toothpaste product in an amount of from about 0.1% to about 6%, preferably from about 0.4% to about 4% by weight, based on the single strength activity, wherein the single strength activity can be expressed as 400 GSA (General Services Administration Assay for Lipase); or as 1000 micromoles of acid produced per minute at 25° C. from the hydrolysis of an olive oil emulsion.

Other proteases, polysaccharidases and lipases having a similar action to the above-mentioned enzymes in the removal of dental plaque or the prevention of its formation may also be added, alone or in combination, to our anhydrous toothpaste base. Many of these enzymes will also aid in the conversion of masses of attached carbohydrates or proteins to more freely flowable forms. Thus, the removal or prevention of plaque formation together with the maintenance of a clean oral cavity will afford a degree of protection against the formation of calculus and dental caries.

Fluorides which are useful in prevention of dental caries, such as sodium fluoride, potassium fluoride, sodium silicofluoride, stannous fluoride, stannic fluoride, stannous chlorofluoride, potassium stannous fluoride, and the like may be added at levels of from about 0.5% to about 1%, preferably from about .1% to about .5% by weight, based on the weight of the finished toothpaste.

Bleaching agents for the teeth, such as oxidizing agents, optical brighteners, and other such agents which achieve a whitening or brightening effect when applied to the teeth, may be added to our anhydrous toothpaste base. Sodium perborate, sodium pyrophosphate peroxide, hydrogen peroxide, sodium peroxide, sodium persulfate, sodium percarbonate, and urea peroxide, added at levels of from about .1% to about 5%, preferably from about .5% to about 1% by weight, based on the finished toothpaste are especially recommended. They may be used alone or in combination with one another.

Optical brighteners such as 4 - methyl - 7 - hydroxycoumarin and 4 - methyl 7 - diethylamino - coumarin may also be added to our anhydrous toothpaste base, in an amount of from about 0.01% to about 0.1% by weight, based on the weight of the toothpaste formulation.

Water incompatible dentifrice ingredients other than the above-mentioned products may also be included within the scope of our invention. The anhydrous toothpaste base will provide a protective vehicle for any water incompatible ingredient suitable for use in the oral cavity, particularly therapeutic agents whose efficacy is diminished by anhydrous toothpaste formulations.

The following non-limitive examples illustrate the invention:

EXAMPLE 1

Preparation of anhydrous base with abrasive

The following ingredients (A) are mixed and melted at 65–70° C.:

| | Gm. |
|---|---|
| Polyethylene Glycol 1500 (Union Carbide) | 100 |
| Polyethylene Glycol 600 (Union Carbide) | 100 |
| Polyethylene Glycol 4000 U.S.P. | 5 |
| Propylene Glycol, U.S.P. | 50 |

The heat is discontinued and 5 gm. of VEEGUM F (R. T. Vanderbilt Co.) and 5 gm. of PLASDONE K–29–32 (General Aniline & Film Corp.) are added to the heated ingredient (A). The mixture is stirred vigorously until a uniform slurry (B) is obtained.

The following ingredients (C) are mixed and melted in a steam-jacketted mixer heated to a temperature of 50° C.:

| | Gm. |
|---|---|
| Mineral oil U.S.P. (PENTOL, Sonneborn) | 100 |
| Petrolatum U.S.P. | 40 |
| ATMOS 300 (Atlas Chemical Industries) | 2 |

The following ingredients (D) are passed through No. 20 mesh screen and mixed:

| | Gm. |
|---|---|
| Sodium lauryl sulfate | 20 |
| Hydrated alumina | 457 |
| Titanium dioxide, cosmetic grade | 10 |
| Saccharin sodium powder, N.F. | 1 |
| Saccharin insoluble U.S.P. | 1.5 |
| Calcium cyclamate, U.S.P. (micronized) | 3.5 |
| Aluminum silicate (KAOPOLITE S.F., H. Johnson Co.) | 30 |
| Mannitol N.F. | 50 |

The uniform slurry (B) is added to the ingredients (C) in a steam jacketed mixer and mixed; the ingredients (D) are then added and all ingredients are mixed for 20–25 minutes, after which the heat is discontinued.

EXAMPLE 2

Preparation of anhydrous base without abrasives

The 457 gm. hydrated alumina and 30 gm. aluminum silicate in Example 1 are replaced with 487 gm. of lactose and the procedure used in Example 1 is repeated.

EXAMPLE 3

Preparation of the flavored anhydrous toothpaste

The following ingredients are mixed and blended:

| | G. |
|---|---|
| Peppermint oil, U.S.P. | 12 |
| Menthol U.S.P. | 1 |
| Clove oil U.S.P. | 1 |
| Anise oil U.S.P. | 1 |
| Eucalyptus oil N.F. | 1 |
| Spearmint oil | 4 |
| | 20 |

Add 20 gm. of the above blend to 980 gm. of the product of Example 1 when the formulation is at room temperature and mix until the paste is uniform.

EXAMPLE 4

Preparation of a fluoride containing toothpaste

Add 4 grams of sodium fluoride to 976 grams of the product of Example 1 and 20 grams of the flavor combination of Example 3 and blend, at room temperature, until the paste is uniform.

EXAMPLE 5

Preparation of a fluoride containing non-abrasive toothpaste

The procedure of Example 4, above, is followed except that 976 grams of the product of Example 2 is used in place of the product of Example 1.

EXAMPLE 6

Preparation of a toothpaste containing a bleaching agent

Add 10 grams of sodium perborate to 970 grams of the product of Example 1 and 20 grams of the flavor combination of Example 3 and blend, at room temperature, until the paste is uniform.

EXAMPLE 7

Preparation of a non-abrasive toothpaste containing a bleaching agent

The procedure of Example 6, above, is followed except that 970 grams of the product of Example 2 is used in place of the product of Example 1.

EXAMPLE 8

Preparation of protease containing toothpaste

Add 20 grams (based on single strength activity determination or an equivalent amount based on the determined activity) of the hydrolytic enzyme composition of U.S. 3,194,738 to 960 grams of the product of Example 1 and 20 grams of the flavor combination of Example 3 and blend at room temperature, until the paste is uniform.

EXAMPLE 9

Preparation of protease containing non-abrasive toothpaste

The procedure of Example 8, above, is followed, except that 960 grams of the product of Example 2 is used in place of the product of Example 1.

EXAMPLE 10

Preparation of dextranase containing toothpaste

Add 20 grams (based on single strength activity determination or an equivalent amount based on the determined activity) of dextranase to 960 grams of the product of Example 1 and 20 grams of the flavor combination of Example 3 and blend at room temperature, until the paste is uniform.

EXAMPLE 11

Preparation of dextranase containing non-abrasive toothpaste

The procedure of Example 10, above, is followed except that 960 grams of the product of Example 2 is used in place of the product of Example 1.

EXAMPLE 12

Preparation of a glycerol ester hydrolase containing toothpaste

Add 20 grams (based on single strength activity determination or an equivalent amount based on the determined activity) of glycerol ester hydrolase to 960 grams of the product of Example 1 and 20 grams of the flavor combination of Example 3 and blend at room temperature, until the paste is uniform.

EXAMPLE 13

Preparation of a glycerol ester hydrolase containing non-abrasive toothpaste

The procedure of Example 12, above, is followed except that 960 grams of the product of Example 2 is used in place of the product of Example 1.

It is understood that the foregoing detailed description is given merely by way of illustration and that many variations may be made therein without departing from the spirit of our invention.

Having described our invention, what we desire to secure by Letters Patent is:

1. A substantially anhydrous toothpaste formulation suitable for use in the oral cavity comprising:
   (a) an oil having a viscosity of from about 100 to about 300 centipoises at 70° F., selected from the group mineral oil, light liquid petrolatum containing a thickening agent, and a vegetable oil containing a stabilizing amount of an antioxidant, said oil ingredient being present in an amount of from about 5% to about 35% by weight, based on the weight of the finished toothpaste composition;
   (b) a polyethylene glycol composition having a viscosity of about 2200 to about 3400 centipoises at 70° F., said polyethylene glycol composition containing a combination of polyethylene glycols having molecular weights ranging from about 550 to about 6000, said polyethylene glycol composition being present in an amount of from about 15% to about 50% by weight, based on the weight of the finished toothpaste composition;
   (c) a non-ionic emulsifier which is a mixture of glycerides of $C_{12}$ to $C_{17}$ fat-forming fatty acids, said non-ionic emulsifier being present in an amount of from about 0.1% to about 0.5% by weight based on the weight of the finished toothpaste composition,
   (d) a binding agent which is at least one member selected from the group polyvinylpyrrolidone and colloidal magnesium aluminum silicate, said binding agent being present in an amount of from about 0.2% to about 2% by weight, based on the weight of the finished toothpaste composition; and
   (e) a compound having a negative heat of hydration which is a hexahydric alcohol selected from the group mannitol and inositol, said compound having a negative heat of hydration being present in an amount of from about 1% to about 10% by weight, based on the weight of the finished toothpaste composition.

2. A substantially anhydrous toothpaste formulation according to claim 1 wherein:
   (a) the oil ingredient is present in said anhydrous toothpaste formulation in an amount of from about 10% to about 30% by weight, based on the weight of the finished toothpaste composition;
   (b) the polyethylene glycol composition is present in said anhydrous toothpaste formulation in an amount of from about 20% to about 30% by weight;
   (c) the non-ionic emulsifier is present in said anhydrous toothpaste formulation in an amount of from about 0.2% to about 0.3% by weight;
   (d) the binding agent is present in said anhydrous toothpaste formulation in an amount of from about 0.4% to about 1% by weight;
   (e) the compound having a negative heat of hydration is present in said anhydrous toothpaste formulation in an amount of from about 3% to about 5% by weight; and
   (f) the abrasive is present in said anhydrous toothpaste formulation in an amount of from about 40% to about 60% by weight.

References Cited

UNITED STATES PATENTS

| | | | |
|---|---|---|---|
| 2,052,694 | 9/1936 | Breivogel | 424—53 |
| 2,130,034 | 9/1938 | Schmidt | 424—58 |
| 3,194,738 | 7/1965 | Harrisson et al. | 424—48 |
| 3,227,617 | 1/1966 | Manahan et al. | 424—52 |

OTHER REFERENCES

Fitzgerald et al.: J. American Dental Association, vol. 76, No. 2, pages 301–304, January 1968.

RICHARD L. HUFF, Primary Examiner